(12) United States Patent
Billhartz et al.

(10) Patent No.: US 7,965,743 B2
(45) Date of Patent: *Jun. 21, 2011

(54) METHOD AND SYSTEM FOR THE BLIND DETERMINATION OF FREQUENCY HOPPING SYSTEM CHARACTERISTICS AND SYNCHRONIZATION THERETO

(75) Inventors: Thomas Jay Billhartz, Melbourne, FL (US); Travis Lee Berrier, Melbourne, FL (US); Christopher Douglas Moffatt, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/415,336

(22) Filed: Mar. 31, 2009

(65) Prior Publication Data

US 2009/0225789 A1   Sep. 10, 2009

Related U.S. Application Data

(63) Continuation of application No. 10/216,278, filed on Aug. 12, 2002, now Pat. No. 7,555,013.

(51) Int. Cl.
   *H04J 3/06* (2006.01)
   *H04L 12/28* (2006.01)

(52) U.S. Cl. ........................... 370/503; 370/255

(58) Field of Classification Search .............. None
   See application file for complete search history.

(56) References Cited

U.S. PATENT DOCUMENTS

| | | | |
|---|---|---|---|
| 5,121,408 A | 6/1992 | Cai et al. | |
| 5,386,435 A | 1/1995 | Cooper et al. | |
| 5,430,775 A | 7/1995 | Fulghum et al. | |
| 5,509,027 A | 4/1996 | Vook et al. | |
| 5,533,025 A | 7/1996 | Fleek et al. | |
| 5,590,410 A * | 12/1996 | Deutsch et al. | 455/76 |
| 6,298,054 B1 * | 10/2001 | Dorenbosch et al. | 370/350 |
| 6,539,004 B1 | 3/2003 | Sawyer | |
| 6,603,799 B1 | 8/2003 | Hlasny | |
| 6,711,151 B1 | 3/2004 | Ziegler | |
| 6,718,395 B1 | 4/2004 | Ziegler | |
| 6,768,747 B1 * | 7/2004 | Dogan | 370/509 |
| 6,847,616 B2 | 1/2005 | Horisaki et al. | |
| 7,006,587 B1 | 2/2006 | Lewis et al. | |
| 7,161,923 B2 | 1/2007 | Young | |
| 7,187,732 B2 | 3/2007 | Demir | |
| 7,499,706 B1 * | 3/2009 | Kallio et al. | 455/450 |
| 2002/0080769 A1 | 6/2002 | Spencer et al. | |
| 2003/0103486 A1 | 6/2003 | Salt et al. | |

(Continued)

*Primary Examiner* — Warner Wong
(74) *Attorney, Agent, or Firm* — Duane Morris, LLP (57) ABSTRACT

A method and system for achieving synchronization at a local site to a wireless communication system transmitting data in a plurality of data packets distributed among a plurality of frequencies alternating in a sequence determined in accordance with at least two characteristics of said remote site by blindly determining at least one of said two characteristics are disclosed. The method comprises the steps of recording a plurality of occurrences of a selected one of the plurality of frequencies, determining the at least one first characteristic from at least one of the data packets, determining locally the at least one second characteristic wherein the determined at least one first characteristic and the at least one second characteristic match the selected frequency at each of the recorded detected occurrences, determining a time period for determining the first and second characteristics; and adjusting the at least one second characteristic by the time period.

34 Claims, 11 Drawing Sheets

U.S. PATENT DOCUMENTS

| | | |
|---|---|---|
| 2003/0147424 A1 | 8/2003 | Famolari |
| 2003/0152110 A1 | 8/2003 | Rune |
| 2003/0169711 A1 | 9/2003 | Borowski et al. |
| 2004/0125821 A1 | 7/2004 | Kuhl |
| 2006/0209903 A1 | 9/2006 | Findikli |
| 2007/0091934 A1 | 4/2007 | Myles et al. |

* cited by examiner

METHOD AND SYSTEM FOR THE BLIND DETERMINATION OF FREQUENCY HOPPING SYSTEM CHARACTERISTICS AND SYNCHRONIZATION THERETO

RELATED APPLICATIONS

The instant application is a continuation of and claims the priority benefit of application Ser. No. 10/216,278, filed Aug. 12, 2002 now U.S. Pat. No. 7,555,013, the entirety of which is incorporated herein in its entirety.

BACKGROUND OF THE INVENTION

This application is related to the field of wireless communication systems and more specifically to achieving frequency synchronization to a wireless communication system by blindly determining its frequency hopping characteristics.

Wireless communications has begun to create an ever-expanding group of uses and users. Wireless communications first used for two-way communication in radios and cellular telephony (cell phones) now includes services such as two-way text transmission and even INTERNET access. However, the available bandwidth for wireless communication does not increase as rapidly as the number of users or services increases.

One popular protocol for wireless communication, entitled BLUETOOTH, employs a TDMA spread-spectrum frequency agile or hopping sequence to distribute the available bandwidth among a plurality of users. Frequency hopping and Time Division Multiplexing are well known in the art. BLUETOOTH technology operates on 79 one-MHz channels or frequencies that randomly alternate or change at a rate of 1600 hops/sec. Within each channel are also time division slots that are allocated to active users and contain a portion of the active user's message. The frequency agile or hopping sequence of the BLUETOOTH protocol or specification is based on a Pseudo-random (PRN) number that is generated in accordance with the value of a master node system clock. The pseudo-random sequence length is such that the random number sequence has a repetition period on the order of an entire day. Thus, a user wishing to obtain access to the network must have knowledge of the parameters used to generate the frequency hopping sequence to obtain synchronization with the master node. These parameters are provided in a specific message from the master node that is transmitted when the connection is set up. In the case of BLUETOOTH protocol, these parameters include the master's 8-bit Upper Address Part (UAP), 24-bit Lower Address Part (LAP) and the 27 most significant bits (MSBs) of its associated clock value, providing sufficient information to a receiving system to synchronize with the frequency hopping sequence.

However, there are many instances where a user desires only to monitor the network and not actively participate. But even in these cases, the user must obtain the necessary information from the server to achieve synchronization with the frequency hopping sequence of the master node. This exchange of information process requires system resources and delays (and may even block) the entry of other users to the network.

Hence, there is a need for a method and system for determining locally the master node frequency hopping sequence and achieving synchronization without exchanging all the needed information or using available bandwidth.

BRIEF DESCRIPTION OF THE DRAWINGS

FIGS. 1 through 6 and the accompanying detailed description contained herein are to be used as an illustrative embodiment of the present invention and should not be construed as the only manner of practicing the invention.

FIG. 3b illustrates a method for encoding the HEC part of the header illustrated in FIG. 3a;

FIG. 3c illustrates a method for generating a ⅓ repetitive whitening code for the header part of the data packet illustrated in FIG. 3a;

It is to be understood that these drawings are for purposes of illustrating the concepts of the invention and are not to scale. It will be appreciated that the same reference numerals, possibly supplemented with reference characters where appropriate, have been used throughout to identify corresponding parts.

DETAILED DESCRIPTION OF THE INVENTION

Figure 1:
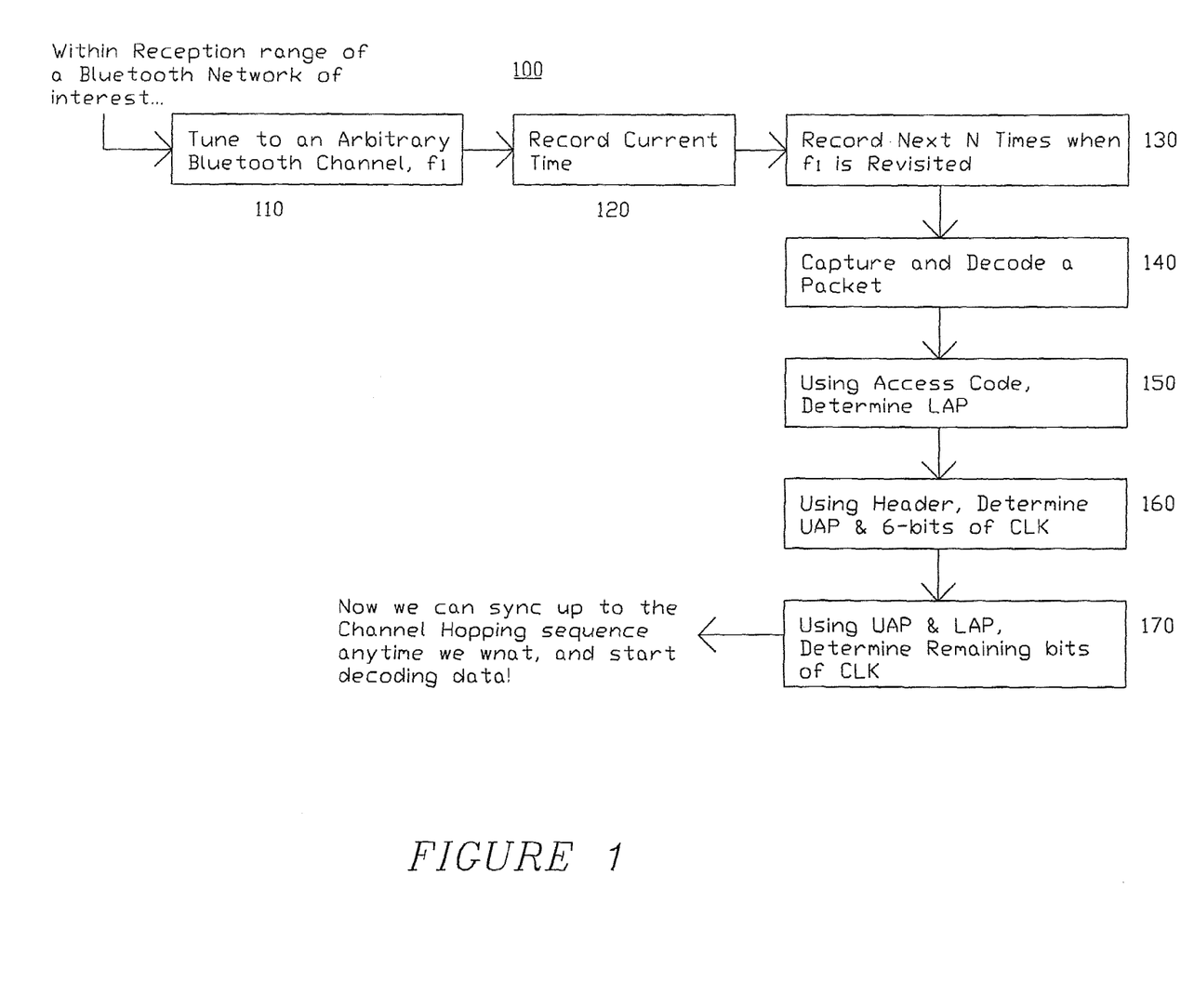
FIG. 1 illustrates a block diagram of an exemplary process for determining frequency hopping sequence in accordance with the principles of the present invention.

FIG. 1 illustrates a block diagram of an exemplary process 100 for blindly determining frequency hopping and achieving synchronization in a wireless communication system in accordance with the principles of the invention. In this exemplary process, at block 110, a receiver is tuned to a selected one of a plurality of known frequencies in the hopping sequence. At block 120, the current time is recorded. At block 130, a record of the time of each occurrence of the detection of the selected frequency is made. At block 140, a packet of information is then captured and decoded. At block 150, the lower address, i.e., LAP, of the master node is determined from the access code. At block 160, the upper address, i.e., UAP, of the master node is determined from the header information along with the 6 bits of the master node clock. At block 170, the remaining master node clock bits are determined by matching the recorded times of occurrences of the selected frequency.

Figure 2A:
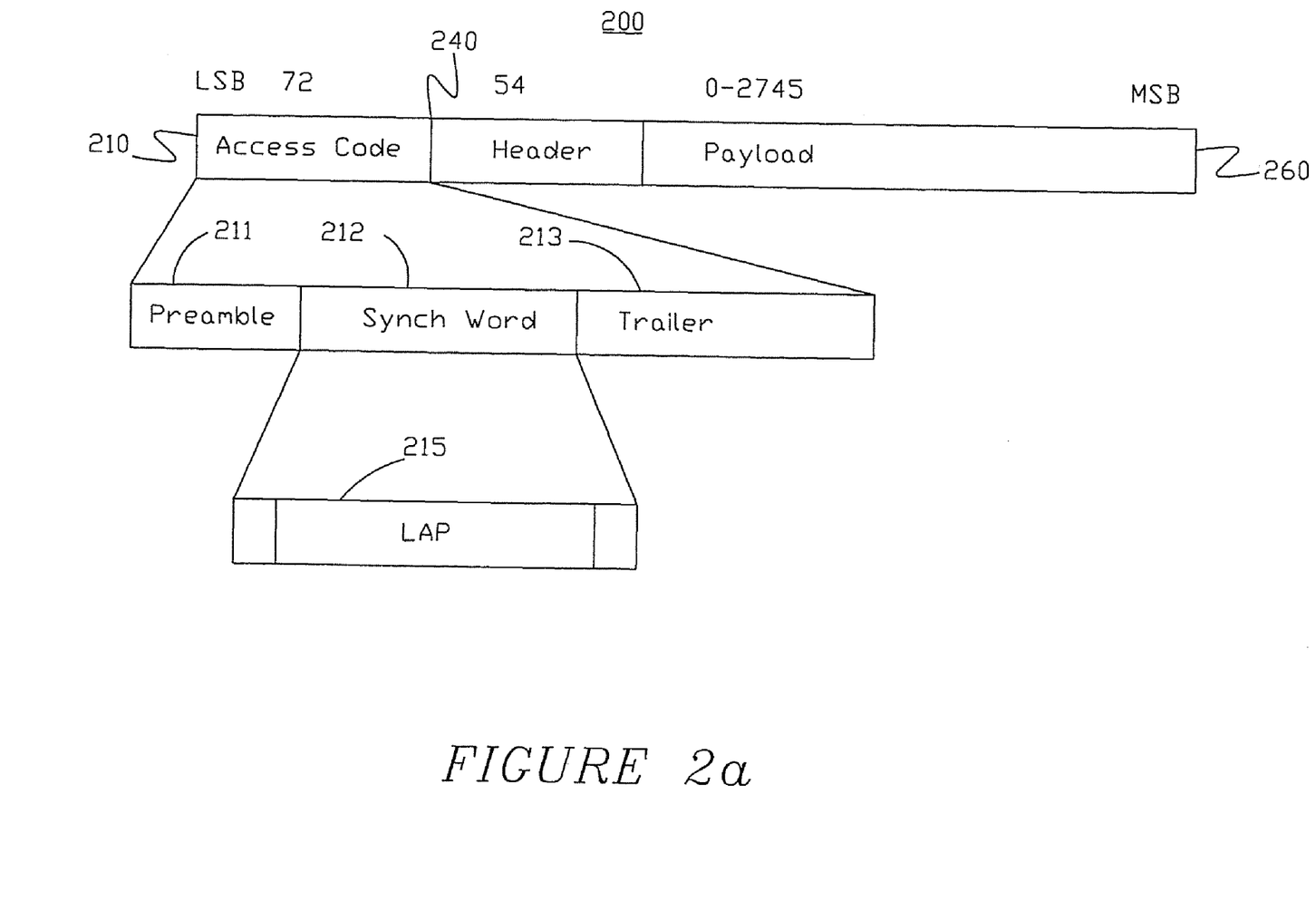
FIG. 2a depicts an access code part of a conventional BLUETOOTH packet format.

FIG. 2a illustrates a conventional packet structure 200 of a wireless communication system using BLUETOOTH technology. In this conventional BLUETOOTH packet structure, 72 bits are allocated for access code 210, 54 bits are allocated for header 240 information and up to 2745 bits are allocated for payload. FIG. 2a further illustrates that Access code 210 is partitioned into a 4-bit preamble 211, a 64-bit sync word 212, and possibly a 4-bit trailer 213. Furthermore, synchronization word 212 is based on a (64,30) expurgated block code with an overlay of a 64-bit full length PN-sequence, as specified. In this exemplary case, 24 bits of Synchronization word 212 are allocated for the master node Lower Address Part (LAP) 215. Lower Address Part 215 is representative of a first characteristic of the master station address controlling the hopping sequence.

Figure 2B:
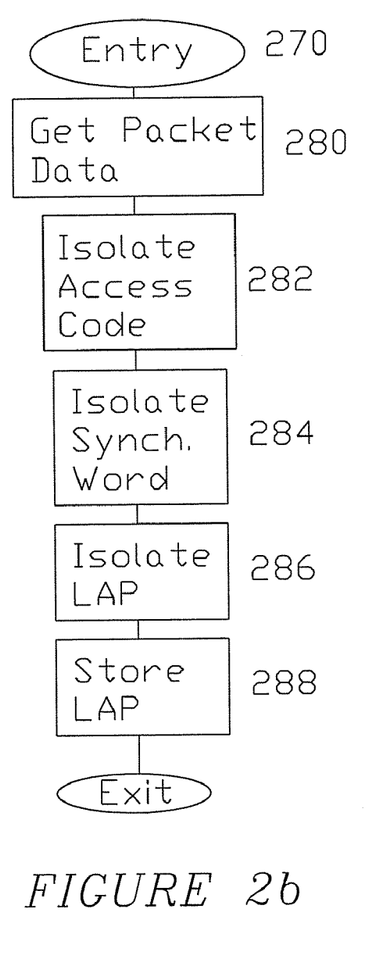
FIG. 2b illustrates a flow chart of an exemplary process for determining a lower address part in accordance with the principles of the present invention.

FIG. 2b illustrates a flow chart of an exemplary process 270 for determining master node Lower Address Part 215 from the transmitted data. In this illustrative process, a transmitted data packet is obtained at block 280. At block 282, the access code 210 is isolated from the obtained data packet. At block 284, the synchronization word 212, within isolated access code 210, is obtained. At block 286, LAP 215 is isolated from the synchronization word 212. At block 288, LAP 215 is stored for further processing. As the bit positions of each element are known, methods for isolating bits are well known by those skilled in the art and need not be discussed in detail.

Figure 3A:
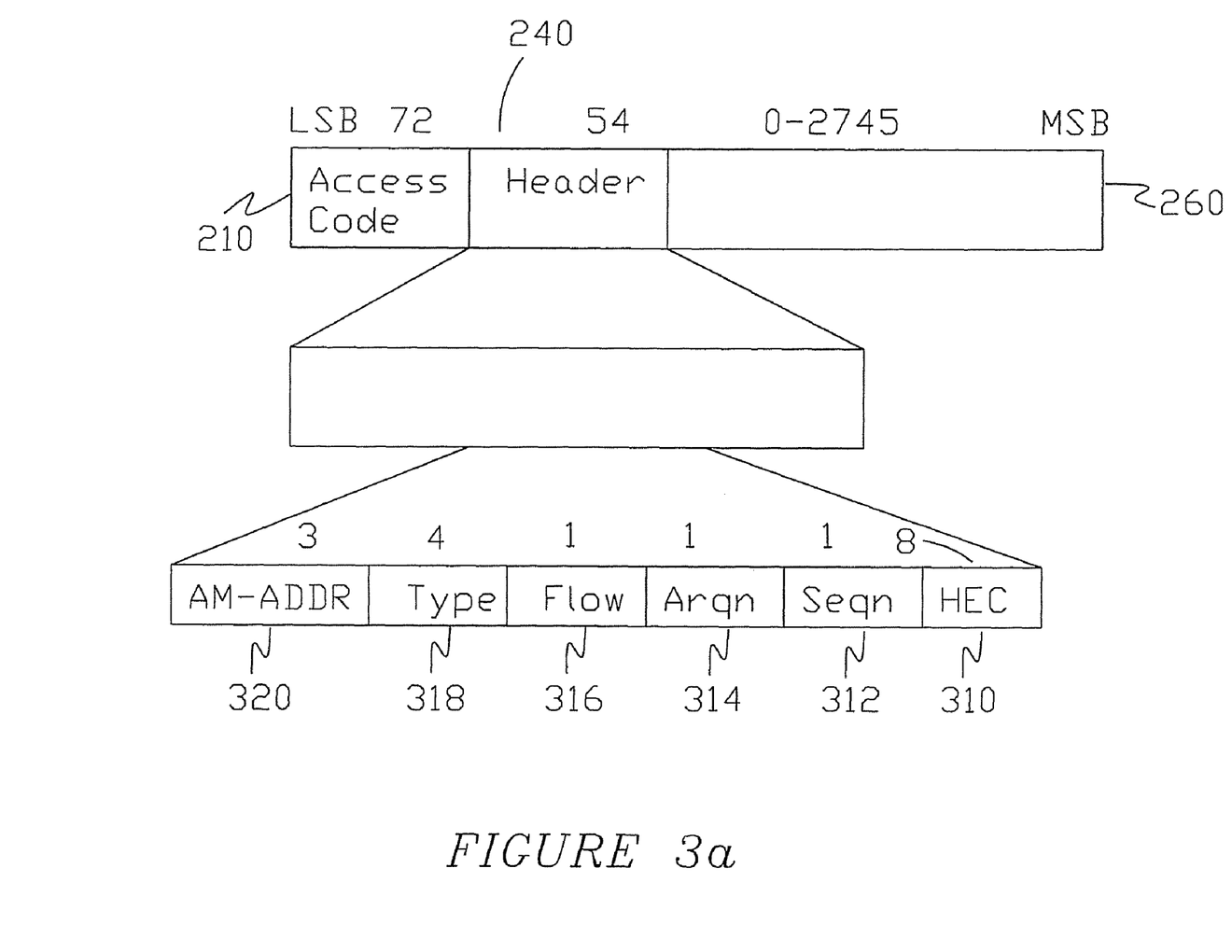
FIG. 3a depicts a header part of a conventional BLUETOOTH packet format.

FIG. 3a details the header structure 240 of packet structure 200 shown in FIG. 2a. In this case, header 240 consists of 54 error-checked, encoded and whitened bits. The header itself, before whitening and before forward error correction is applied, consists of 3-bit active member address (AM_ADDR) 320, 4-bit Type 318, 1-bit Flow control 316, 1-bit acknowledgement indication (ARQN) 314, 1-bit sequence number (SEQN) 312, and an 8-bit Header Error Check.

Figure 3B:
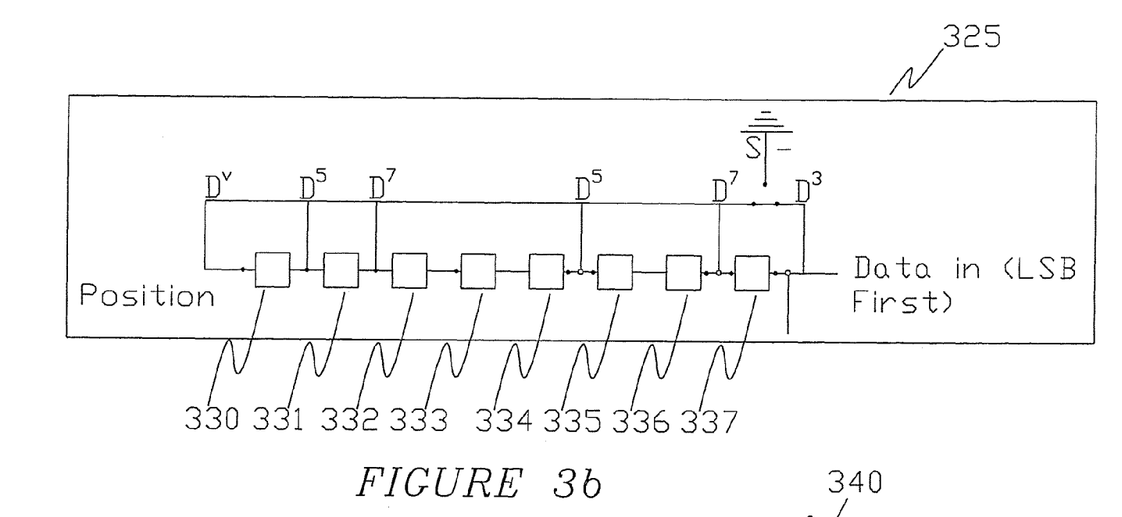

FIG. 3b illustrates an exemplary method for encoding the Header Error Check bits (HEC) 310 bits of the header. In this exemplary method, 8-bit shift register 325, having a predetermined feedback configuration, is initialized with the 8 bits of master node UAP, as will be explained, in corresponding bit positions, represented as 330-337. Selection of a feedback configuration for determining HEC bits is well known in the art in the field of encoded and encryption and need not be discussed in detail herein.

Ten information bits are then clocked into shift register 325, least significant bit first. The output of shift register 325 is representative of the HEC 310. The 8 bit HEC 310 are then appended to the 10 information bits, which are then "whitened" using a Linear Feedback shift Register (LFSR). Then, a ⅓ repetitive code for Forward Error Correction (FEC) is applied.

Figure 3C:
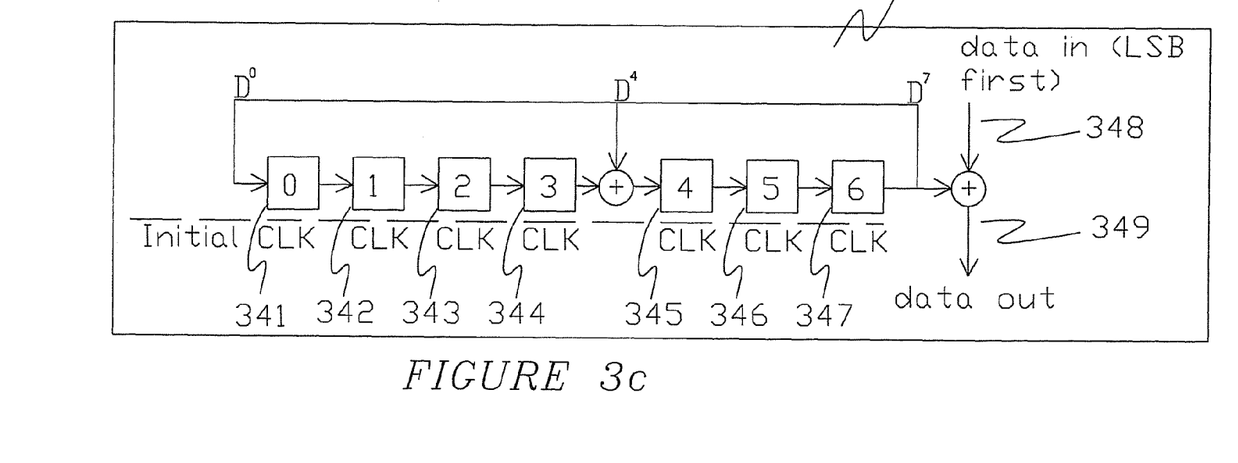

FIG. 3c illustrates an exemplary method for whitening the 18 header bits. In this exemplary method, 7-bit shift register 340, having a predetermined feedback configuration, is initialized with clock bits 6 down to 1 with an extended MSB of value 1 of the master node system clock value in corresponding bit positions, represented as 341-347. The 18 header bits, represented as 348, are then input, LSB first, into shift register 340. The output of shift register 340, represented as 349, is forward error corrected using the ⅓ repetitive code. This produces the forward error corrected, whitened input sequence, which is composed of 18 identical groups of identical three bits.

Figure 3D:
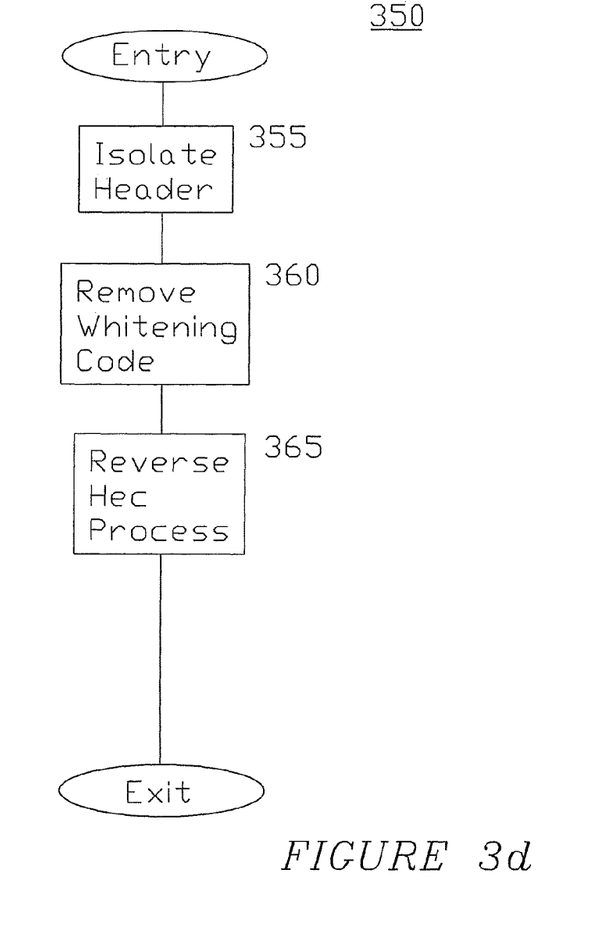
FIG. 3d illustrates a flow chart of an high-level process for determining an upper address part in accordance with the principles of the present invention.

FIG. 3d illustrates an exemplary process 350 for decoding header 240 and determining a master node upper address part (UAP). This illustrated process 350 involves first decoding, at block 355, the encoded FEC ⅓ repetition code header. The decoding process converts the 54 header bits into an 18-bit whitened sequence (54/3=18). At block 360 a linear feedback shift register (LFSR) initialized with a hypothesized lower six bits of the master site, referred to as CLK6-1, is used to de-whiten the header at block 360. As the CLK6-1 bits are unknown, there are 2⁶ or 64 values that may hypothetically be used to initialize the de-whitening LFSR. In order to determine the correct CLK6-1 bits without knowledge of the master site piconet clock each of the 64 possible CLK6-1 values are tested. In one aspect, the 64 possible values may be obtained by incrementally increasing a hypothetical value beginning at a known value, e.g., 0.

At block 360 the whitening factor is removed, i.e., de-whitened, and a 10-bit data field and an 8-bit HEC field are produced. At block 365, the UAP is produced by reversing the HEC process. As the HEC is initially produced by initializing an LFSR with the UAP bits and running the data bits through it, the reverse process may be performed by initializing an LFSR with the HEC bits and running the data though it to produce a UAP. The UAP produced from the header data and HEC are referred to as the header UAP.

Figure 3E:
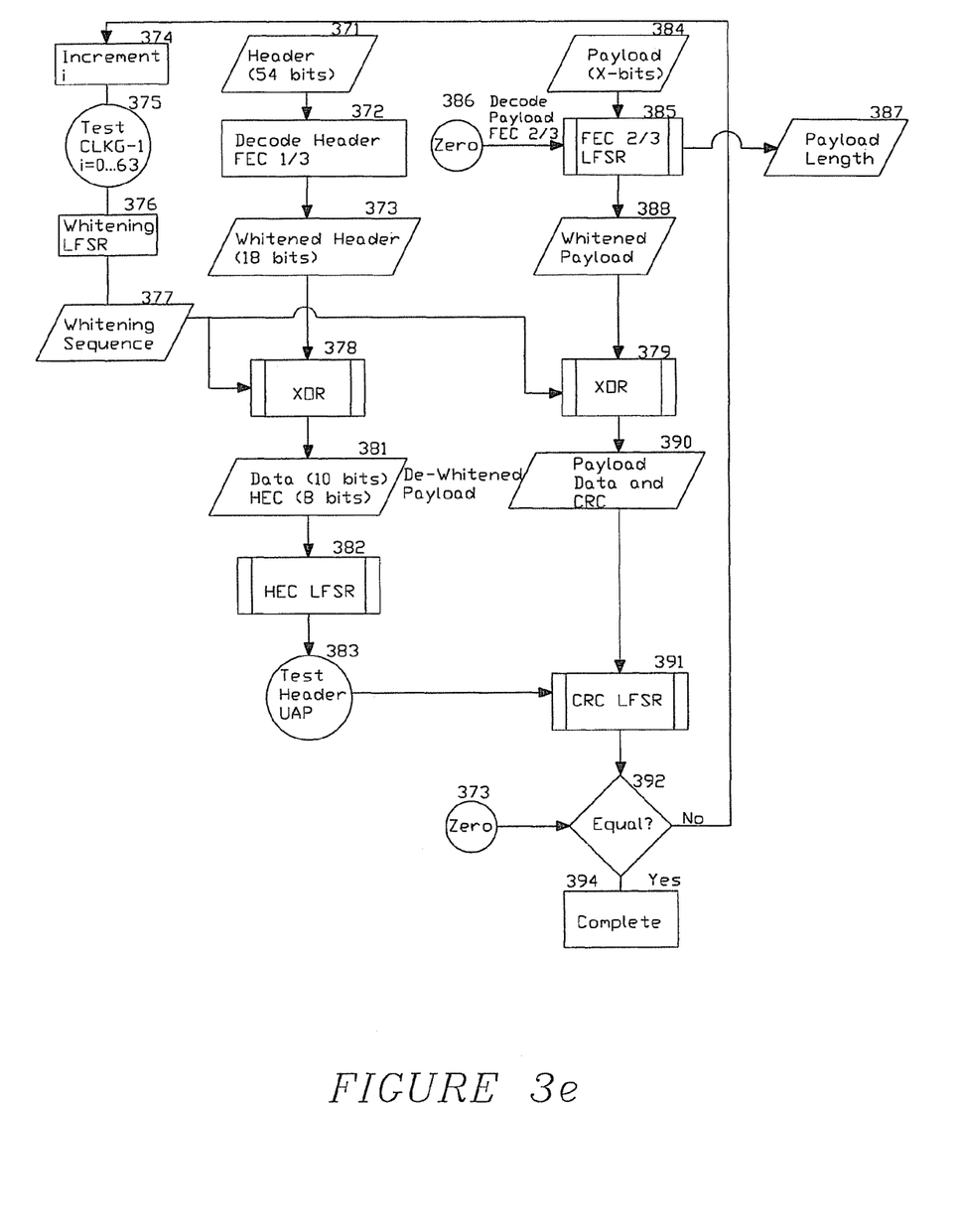
FIG. 3e illustrates a flow chart of an exemplary process for determining an upper address part and six clock bits in accordance with the principles of the invention.

FIG. 3e illustrates a flow chart of an exemplary process 370 depicting in more detail the processing discussed in FIG. 3d. In this illustrative process, the 54 bits of heading information are extracted from the received data packet at block 371. At block 372, the FEC ⅓ code is removed, leaving, at block 373, 18 bits of header data.

The 18 bits of header data are applied to a process, concurrently with a hypothetical or test value of CLK6-1, as will be explained, at block 378. Although the illustrated process is referred to as "XOR" process, it would be understood that other similar logical processes may be easily implemented by those skilled in the art, and, hence, are contemplated and considered within the scope of the invention.

At block 381 ten (10) data bits and eight (8) HEC bits are available as a result of the process executed at block 378. At block 382, the eight HEC bits are loaded into a LFSR and a resultant hypothetical UAP is determined at block 383.

The resultant hypothetical UAP is then applied concurrently with payload data, as will be explained, to a CRC (Cyclical Redundancy Code) LFSR to test this hypothetical UAP value against a hypothetical payload data, at block 391. If the resultant CRC is a known value, e.g., zero, 0, as shown in block 393, then the process is completed and the current hypothetical UAP and CLK6-1 values are stored as the derived values of UAP and CLK6-1 of the master site.

However, if the CRC is not equal, then processing returns to block 374, wherein the current CLK6-1 value is altered, e.g., incremented, and a next hypothetical value of CLK6-1 is obtained. At block 375, the hypothetical value of CLK6-1 is tested to insure it is within allowable limits, i.e., between 0 and 63. At block 376, the hypothetical value of CLK6-1 is applied to a whitening LFSR wherein a whitening sequence is determined, as represented as block 377. The whitening sequence is then concurrently applied to a process executed at block 378, which was previously discussed, and a process for extracting Payload data and CRC at block 379.

The FEC ⅔ code is removed from Payload data, represented as block 384, at block 385, by using a LFSR initialized with zeros, represented as block 386. A result of removing the error correction code is the determination of the payload length, which is stored within the payload, and is represented as block 387.

The whitened payload, represented as block 388, is then applied to process 379 concurrently with a hypothetical CLK6-1 value to de-whiten the payload data and produce payload and CRC data, as represented by block 390.

Figure 4A:
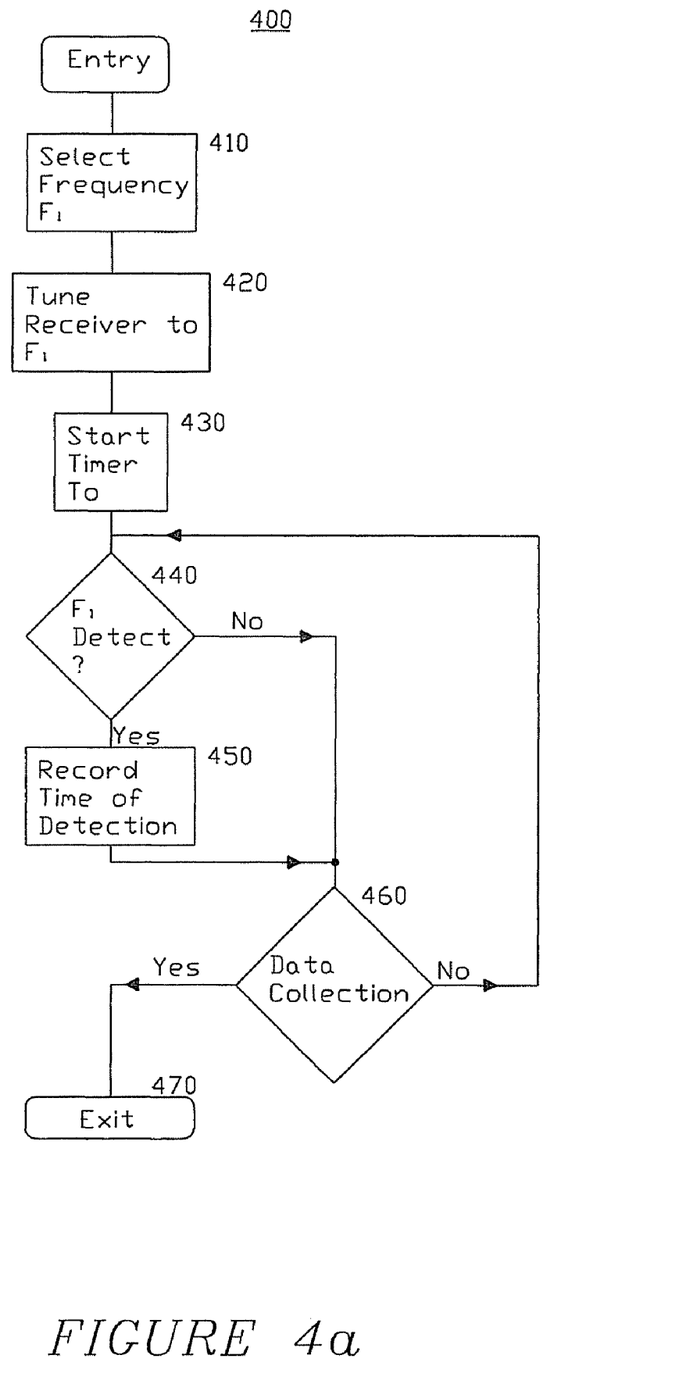
FIG. 4a illustrates a flow chart of an exemplary process for recording frequency hopping in accordance with the principles of the invention.

FIG. 4 illustrates a flow chart 400 of an exemplary process for recording the occurrence of a selected frequency in accordance with one aspect of the present invention. In this illustrated flow chart, a known one of a plurality of frequencies, i.e., $F_1$, is arbitrarily selected at block 410. At block 420, a receiving unit is tuned to receive the selected frequency F1. At block 430 a process timer, i.e., $T_o$, is initialized and, as will be explained, determines the time duration needed to execute the processing that determines the frequency hopping sequence. In an alternative aspect, process timer, $T_o$, is recorded as a current time. At block 440 a determination is made whether selected frequency $F_1$ is detected. If the answer is in the affirmative then a time of detection or occurrence is recorded. Preferably, the time of detection is recorded as a number of system clock tick units. In the case of BLUETOOTH technology each clock tick is in the order of 312.5 microseconds. However, it would be understood that the time may be any other units or an absolute time value, using, for example, Greenwich Meridian Time, GPS Time, etc.

If, however, the answer is negative, then a determination is made, at block 460, whether a sufficient number of interceptions or occurrences of frequency $F_1$ have been recorded. If the answer is in the negative, then processing proceeds to block 440 to await a next/subsequent detection or occurrence of selected frequency $F_1$.

If however, the answer at block 460 is in the affirmative, then this aspect of the processing is completed at block 470. In a preferred embodiment, ten (10) intercepts or occurrences of selected frequency $F_1$ are sufficient to determine a frequency hopping sequence.

Figure 4B:
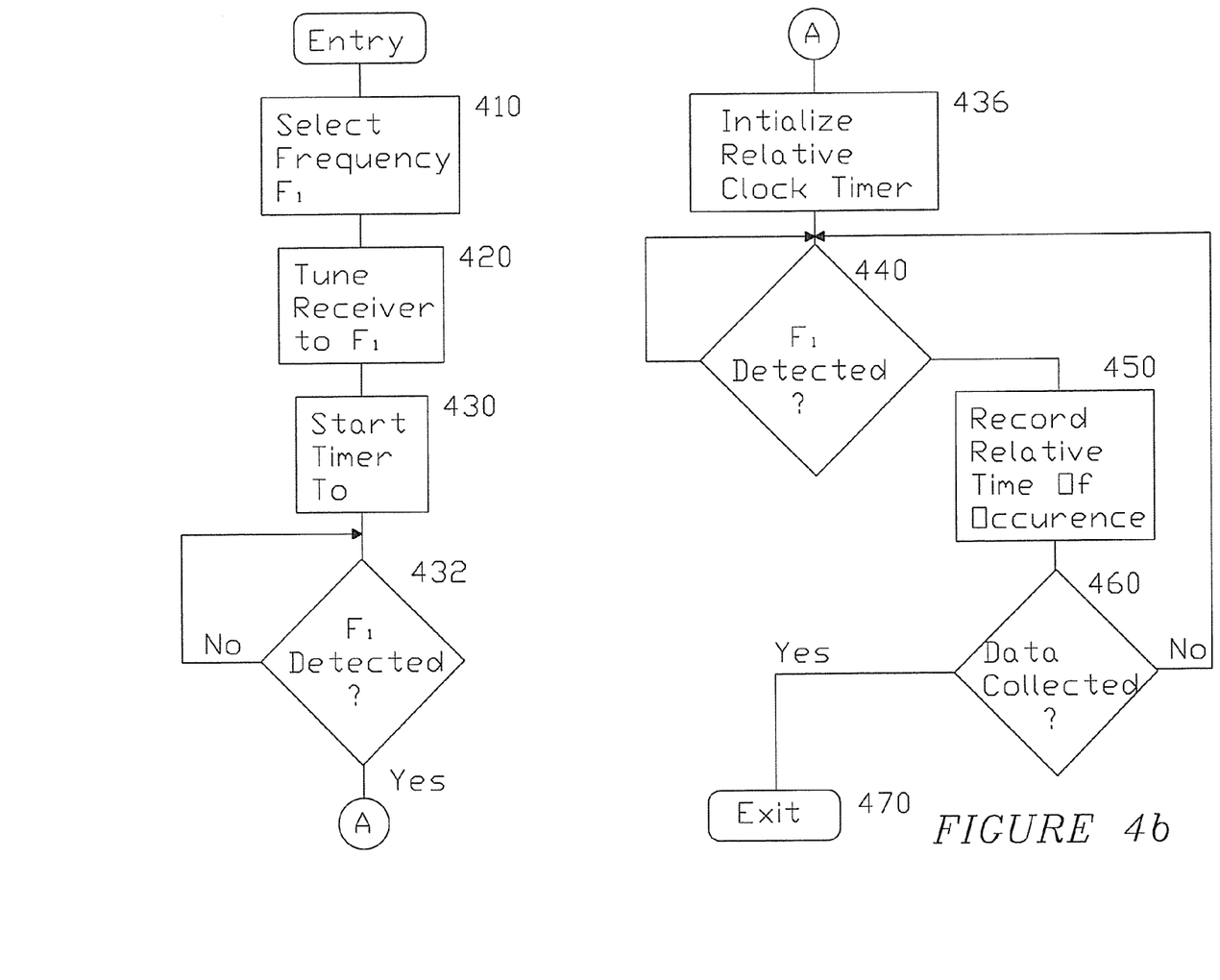
FIG. 4b illustrates a flow chart of a second exemplary process for recording frequency hopping in accordance with the principles of the invention.

FIG. 4b illustrates a flow chart of a second embodiment of the processing for collecting intercept data. In this embodiment, frequency $F_1$ is selected at block 410, a receiver is tuned to frequency $F_1$ at block 420 and a process timer $T_o$ is initialized or recorded at block 430. At block 432, a determination is made whether an intercept of frequency $F_1$ has occurred. If the answer is negative, then processing continues to wait for a detection of frequency $F_1$. If however, the answer is in the affirmative, then at block 436, a time counter is initialized to a known value. This counter is representative of an initial value from which all next/subsequent interceptions or occurrences are relatively measured.

At block 440, a determination is made whether an intercept of frequency $F_1$ has occurred. If the answer is negative, then processing continues to wait for a detection of frequency $F_1$. If, however, the answer is in the affirmative, then at block 450, a relative time of intercept measured with respect to the first intercept time is recorded. In a preferred embodiment, this relative time of intercept is measured in units of clock ticks relative to the time value of the first intercept.

At block 460 a determination is made whether a sufficient number of interceptions or occurrences of frequency $F_1$ have been recorded. If the answer is negative, then processing proceeds to block 440 to await a next/subsequent occurrence of selected frequency $F_1$.

Figure 5:
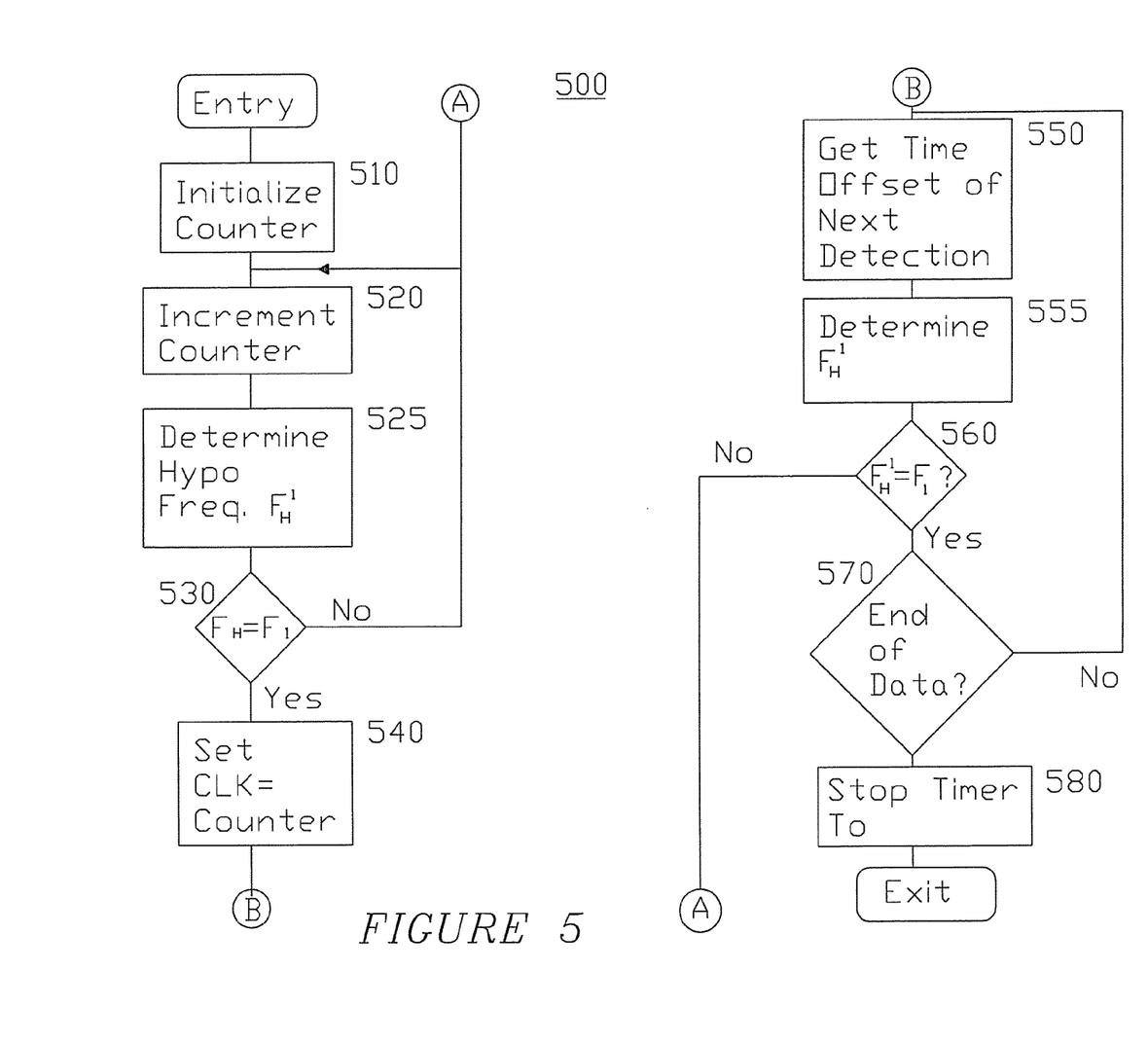
FIG. 5 illustrates a flow chart of an exemplary process for determining a clock value used in generating the recorded frequency hopping sequence.

FIG. 5 illustrates a flow chart of an exemplary process 500 for determining a master clock value used for generating a frequency hopping sequence. In this process 500, a counter value is initialized to a known value at block 510. Preferably, the counter value is initialized to or hypothesized as having a zero value. At block 520, a new hypothesized counter value, referred to as CLK, is obtained by incrementing the previous hypothesized counter value. In a preferred embodiment, the hypothesized clock value is incremented by a unit of the reference clock. In a BLUETOOTH wireless communication system, the reference clock has a resolution or unit value of 312.5 microseconds. It will be appreciated by those skilled in the art that the selected initial value may be first used as a hypothesized counter value by bypassing or not executing the incrementing step at block 520. In another aspect, the selected initial value may be set to an incremental value less than a desired first value to be used as a hypothesized counter value.

At block 525, a hypothesized frequency value is determined using the extracted LAP, UAP and hypothesized clock value. As is well known in the art, and for purposes of illustrating the present invention, in a BLUETOOTH communication system a transmission frequency value is determined based on the master node upper (UAP) and lower (LAP) address parts and the master clock value at the time of transmission.

At block 530, a determination is made whether the determined frequency value based on the hypothesized clock value matches the value of the first selected frequency value $F_1$. If the answer is negative, then processing continues at block 520 where a next hypothesized clock value is obtained. In the illustrated process, a next hypothesized clock value is obtained by incrementing the current counter value.

If, however, the answer is in the affirmative, processing continues at block 550.

At block 550, a next/subsequent time value of occurrence or detection of selected frequency $F_1$ is obtained from the list of recorded occurrences. At block 555, a next/subsequent hypothesized frequency value is determined using the determined LAP, UAP, hypothesized clock value and the next/subsequent time value of detection of selected frequency F1. At block 560, a determination is made whether a determined frequency is equal to or substantially matches the value of the selected frequency value $F_1$.

If the answer is negative, then processing continues at block 520 where a new hypothesized counter is obtained by incrementing the present value of the counter. Processing continues at block 525.

If, however, the answer is in the affirmative, then at block 570 a determination is made whether the end of the recorded data has been reached.

If the answer at block 570 is negative, then processing continues at block 550 where a next/subsequent time value is obtained and tested.

If, however, the answer at block 570 is in the affirmative, then process timer $T_o$ is halted and recorded at block 580. Process 500 is then completed and a value of the master node clock used to generate the frequency hopping sequence corresponding to the recorded occurrences of the detection of a selected frequency at the initial time of recording is determined.

The current time in the frequency hopping sequence is then determined by adjusting the determined value of the system clock as:

$$CLK\ current = CLK + \Delta T_o$$

where $\Delta T_o$ is representative of a time period determined as the difference between starting and ending time of the process.

Figure 6:
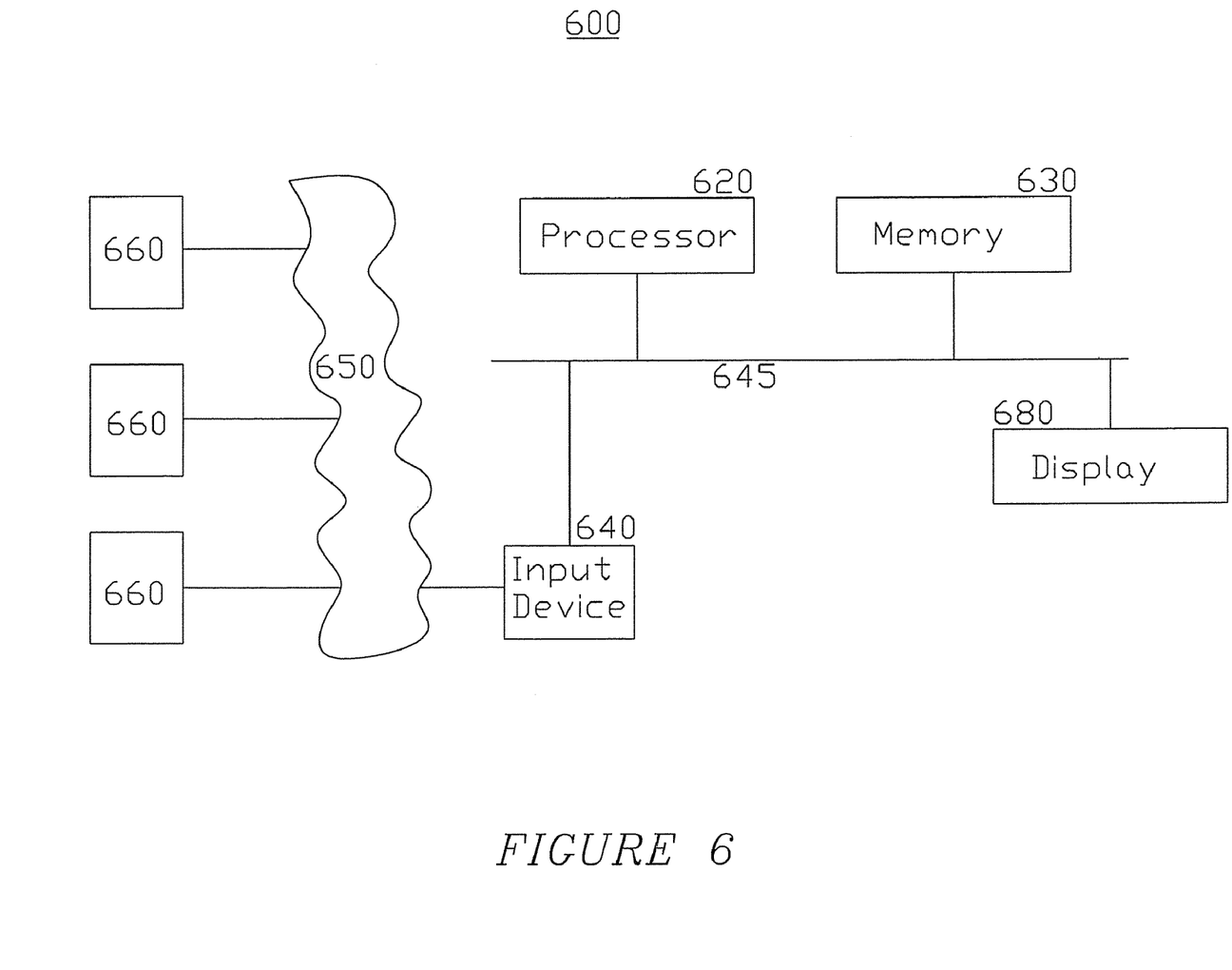
FIG. 6 illustrates an exemplary system for performing the illustrated processing in accordance with the principles of the invention.

FIG. 6 illustrates an exemplary system 600 for practicing the principles of the invention. In this exemplary system, processor 620 is in communication with memory 630 and input device 640 over network 645. As will be appreciated, network 645 and 650 may be an internal network among the components, e.g., ISA bus, microchannel bus, PCMCIA bus, etc., or an external network, such as a Local Area Network, Wide Area Network, POTS network, wireless, or the Internet.

Processor 620 may be any handheld calculator, cell phone, PDA, special purpose or general purpose processing system that can perform the operations illustrated in the figures. Processor 620 may include software or code, which when executed, performs the operations and processes illustrated. The code may be contained in memory 630. Similarly, the operations illustrated in the figures may be performed sequentially or in parallel using different processors to determine specific values or perform specific processes. Input device 640, in this exemplary example, receives data from one or more data sources 660 over a network 650 and the data received may be immediately accessible by processor 620 or may be stored in memory 630. As will be appreciated, input device 640 may also allow for manual input, such as a keyboard or keypad entry or may read data from magnetic or optical medium (not shown).

After processing the input data, processor 620 may display the resultant sequence or indication of obtaining synchronization on display 680.

In a preferred embodiment, the coding and decoding employing the principles of the present invention are implemented by computer readable code executed by processor 620. However, in other embodiments, hardware circuitry may be used in place of, or in combination with, software instructions to implement the invention. For example, the elements illustrated herein may also be implemented as discrete hardware elements, or may be special purpose hardware, such as PALs, FPGAs, or ASICs, which may be programmed to execute the illustrated exemplary processes.

While there has been shown, described, and pointed out, fundamental novel features of the present invention as applied to a preferred BLUETOOTH wireless communication system, it will be understood that various omissions and substitutions and changes in the apparatus described, in the form and details of the devices disclosed, and in their operation, may be made by those skilled in the art without departing from the spirit of the present invention to operate on other types of wireless communication protocols. It is expressly intended that all combinations of those elements which perform substantially the same function in substantially the same way to achieve the same results are within the scope of the invention. Substitutions of elements from one described embodiment to another are also fully intended and contemplated.

What is claimed is:

1. A method for achieving synchronization to a wireless communication system transmitting data in a plurality of data packets employing a plurality of known frequencies determined using at least two characteristics alternating in accordance with a known method, wherein at least one of said two characteristics is contained in at least one transmitted data packet, said method comprising the steps of:
   recording a time of occurrence for each of a plurality of occurrences of a selected one of said plurality of frequencies;
   determining a first characteristic from said at least one transmitted data packet received on said selected frequency;
   determining a second characteristic wherein said first characteristic, said determined second characteristic and each of said recorded times of occurrences generate said selected frequency at each of said recorded occurrences of said selected frequency;
   determining a time period for determining said first and second characteristic; and
   adjusting said second characteristic by said time period.

2. The method as recited in claim 1 wherein said time of occurrence is representative of a measure relative to a time of a first occurrence of said selected frequency.

3. The method as recited in claim 1 wherein said time of occurrence is representative of an absolute measure of time.

4. The method as recited in claim 1 wherein the step of determining said first characteristic comprises:
   isolating a known number of information items at a known position within said data packet.

5. The method as recited in claim 1 wherein the step of determining said second characteristic further comprises the steps of:
   hypothesizing said second characteristic;
   determining a resultant frequency value based on said determined first characteristic and said hypothesized second characteristic; and
   storing said hypothesized second characteristic when said resultant frequency value equals said selected frequency.

6. The method as recited in claim 1 wherein said at least one first characteristic is encoded using a known encoding value and process.

7. The method as recited in claim 6 wherein said first characteristic is decoded by reversing said encoding process.

8. The method as recited in claim 7 wherein said decoding processing further comprises the step of;
   hypothesizing a decoding value; and
   altering said hypothesized decoding value until said encoding value is determined.

9. The method as recited in claim 1 wherein said wireless communication system is a BLUETOOTH system.

10. A system for achieving synchronization to a wireless communication system transmitting data in a plurality of data packets employing a plurality of known frequencies determined in accordance with at least two characteristics alternating using a known method, wherein at least one of said two characteristics is contained in at least one transmitted data packet, said system comprising:
    a receiving unit in communication with a processor and memory wherein said processor is operable to execute code to:
    tune said receiver to a select one of said plurality of frequencies;
    record a time of occurrence for each of a plurality of occurrences of said selected frequency;
    determine said first characteristic from said at least one transmitted data packet received on said selected frequency;
    determine said second characteristic wherein said determined first characteristic, said determined second characteristic and each of said recorded times of occurrences generate said selected frequency at each of said recorded occurrences of said selected frequency;
    determine a time period for determining said first and second characteristic; and
    adjust said second characteristic by said time period.

11. The system as recited in claim 10 wherein said time of occurrence is representative of a measure relative to a time of a first occurrence of said selected frequency.

12. The system as recited in claim 10 wherein said time of occurrence is representative of an absolute measure of time.

13. The system as recited in claim 10 wherein said processor is further operable to execute code to:
    isolate a known number of bits at a known position within said data packet.

14. The system as recited in claim 10 wherein said processor is further operable to execute code to:
    hypothesize said second characteristic;
    determine a resultant frequency value based on said determined first characteristic and said hypothesized second characteristic; and
    store said hypothesized second characteristic when said resultant frequency value equals said selected frequency.

15. The system as recited in claim 10 wherein said processor is further operable to execute code to:

extract a known number of information items from a known position within said data packets.

16. The system as recited in claim 10 wherein said first characteristic is encoded using a known encoding value and process.

17. The system as recited in claim 16 wherein said processor is further operable to execute code to:
determine said first characteristic is decoded by reversing said encoding process.

18. The system as recited in claim 17 wherein said processor is further operable to execute code to:
hypothesize a decoding value; and
alter said hypothesized decoding value until said encoding value is determined.

19. The system as recited in claim 10 wherein said code is contained in said memory.

20. The system as recited in claim 10 wherein said wireless communication system is a BLUETOOTH system.

21. A method for blindly determining characteristics used for the generation of a plurality of frequencies in a frequency hopping wireless communication system transmitting data in a plurality of data packets, wherein a first one of said characteristics is contained in at least one of said transmitted data packets, said method comprising the steps of:
recording a time of occurrence for each of a plurality of occurrences of a selected one of said plurality of frequencies;
determining said first characteristic from said at least one transmitted data packet received on said selected frequency; and
determining at least one second characteristic wherein said first characteristic, said determined at least one second characteristic and each of said recorded times of occurrences generate said selected frequency at each of said recorded occurrences of said selected frequency wherein said first characteristic comprises a lower address part (LAP) of a BLUETOOTH message.

22. The method as recited in claim 21 wherein said time of occurrence is representative of a measure relative to a time of a first occurrence of said selected frequency.

23. The method as recited in claim 21 wherein said time of occurrence is representative of an absolute measure of time.

24. The method as recited in claim 21 wherein the step of determining first characteristic comprises:
isolating a known number of information items at a known position within said data packet.

25. The method as recited in claim 21 wherein the step of determining said at least one second characteristic further comprises the steps of:
hypothesizing said at least one second characteristic;
determining a resultant frequency value based on said determined first characteristic and said hypothesized at least one second characteristic; and
storing said hypothesized at least one second characteristic when said resultant frequency value equals said selected frequency.

26. The method as recited in claim 21 wherein said first characteristic is encoded using a known encoding value and process.

27. The method as recited in claim 26 wherein said first characteristic is decoded by reversing said encoding process.

28. The method as recited in claim 27 wherein said decoding processing further comprises the step of;
hypothesizing a decoding value; and
altering said hypothesized decoding value until said encoding value is determined.

29. The method as recited in claim 21 wherein said wireless communication system is a BLUETOOTH system.

30. The method as recited in claim 21 wherein said at least one second characteristic is a clock value.

31. The method as recited in claim 1 wherein said first characteristic comprises a lower address part (LAP) of a BLUETOOTH message.

32. The method as recited in claim 1 wherein said second characteristic comprises a master clock value.

33. The system as recited in claim 10 wherein said first characteristic comprises a lower address part (LAP) of a BLUETOOTH message.

34. The system as recited in claim 10 wherein said second characteristic comprises a master clock value.

* * * * *